United States Patent
DeRosa

(10) Patent No.: US 7,031,101 B1
(45) Date of Patent: Apr. 18, 2006

(54) METHODS, APPARATUS AND COMPUTER PROGRAM PRODUCTS FOR CONTROLLING SEEKING OF A TRANSDUCER BASED ON PHASE DEPENDENT STATE ERROR

(75) Inventor: Jeffrey V. DeRosa, Shrewsbury, MA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 10/894,504

(22) Filed: Jul. 20, 2004

Related U.S. Application Data

(60) Provisional application No. 60/559,625, filed on Apr. 5, 2004.

(51) Int. Cl.
    *G11B 5/596* (2006.01)
(52) U.S. Cl. .................................................. 360/78.09
(58) Field of Classification Search ............... None
    See application file for complete search history.

(56) References Cited

U.S. PATENT DOCUMENTS

| | | | |
|---|---|---|---|
| 5,412,809 A * | 5/1995 | Tam et al. ................ | 713/324 |
| 5,844,743 A * | 12/1998 | Funches .................. | 360/78.04 |
| 6,310,743 B1 | 10/2001 | Haines et al. ............ | 360/78.07 |
| 6,510,019 B1 | 1/2003 | DeRosa .................... | 360/78.06 |
| 6,515,819 B1 | 2/2003 | Schmidt et al. .......... | 360/78.04 |
| 6,570,733 B1 | 5/2003 | Waugh et al. ............ | 360/78.06 |
| 6,597,528 B1 * | 7/2003 | Ding et al. .............. | 360/78.04 |
| 6,597,529 B1 | 7/2003 | DeRosa .................... | 360/78.14 |

* cited by examiner

*Primary Examiner*—David Hudspeth
*Assistant Examiner*—Mitchell Slavitt
(74) *Attorney, Agent, or Firm*—Myers Bigel Sibley & Sajovec, PA

(57) ABSTRACT

A transducer is controlled during seeking based on an acceleration-phase state error. While seeking, the transducer is moved from an initial track to a target track on the disk based on a current command. At least one transducer state relative to the disk is estimated while seeking. At least one transducer state relative to the disk is measured while seeking. An acceleration-phase state error is determined that is indicative of an error between the estimated at least one transducer state and the measured at least one transducer state as the transducer is accelerated toward the target track during the seeking. The current command is generated based on the acceleration-phase state error.

27 Claims, 4 Drawing Sheets

METHODS, APPARATUS AND COMPUTER PROGRAM PRODUCTS FOR CONTROLLING SEEKING OF A TRANSDUCER BASED ON PHASE DEPENDENT STATE ERROR

RELATED APPLICATION

This application claims the benefit of and priority to U.S. Provisional Patent Application No. 60/559,625, titled "REAL-TIME SYSTEM IDENTIFICATION", filed Apr. 5, 2004, the disclosure of which is hereby incorporated herein by reference as if set forth in its entirety.

FIELD OF THE INVENTION

The present invention generally relates to digital data storage devices and, more particularly, to methods, apparatus, and computer program products for seeking a transducer between tracks on a disk in a disk drive.

BACKGROUND OF THE INVENTION

Disk drives are digital data storage devices which can enable users of computer systems to store and retrieve large amounts of data in a fast and efficient manner. A typical disk drive includes a plurality of magnetic recording disks which are mounted to a rotatable hub of a spindle motor and rotated at a high speed. An array of read/write transducers is disposed adjacent surfaces of the disks to transfer data between the disks and a host computer. The transducers can be radially positioned over the disks by a rotary actuator and a closed loop, digital servo system, and are can fly proximate the surfaces of the disks upon air bearings.

A plurality of nominally concentric tracks can be defined on each disk surface. A preamp and driver circuit generates write currents that are used by the transducer to selectively magnetize the tracks during a data write operation and amplifies read signals detected by the transducer from the selective magnetization of the tracks during a data read operation. A read/write channel and interface circuit are connected to the preamp and driver circuit to transfer the data between the disks and the host computer.

The servo system can operate in two primary modes: seeking and track following. During a seek, a selected transducer is moved from an initial track to a destination track on the corresponding disk surface. The servo system applies current to an actuator coil to first accelerate and then decelerate the transducer toward the destination track.

During the seek, the servo system may sequentially measure the actual velocity of the transducer and adjust the current in relation to velocity error (i.e., the difference between the actual velocity and a target velocity). As the transducer approaches the destination track, the servo system initiates a settle mode to bring the transducer to rest over the destination track within a selected settle threshold, such as a percentage of the track width from track center. Thereafter, the servo system enters the track following mode wherein the transducer is nominally maintained over the center of the destination track until another seek is performed.

As will be appreciated, a disk drive is primarily utilized to transfer data between the tracks of the disks and the host computer. Such data transfer operations usually cannot occur during a seek, but rather require the drive to be in track following mode. Hence, to maximize disk drive data transfer rate capabilities, disk drives can attempt to obtain minimum average seek times. However, obtaining minimum seek times may be complicated by the fact that disk drive settle performance can be adversely affected by variation of physical and/or electrical operational parameters of the disk drive over time, such as due to temperature variations and power supply voltage fluctuations.

SUMMARY OF THE INVENTION

Some embodiments of the present invention provide methods of controlling seeking of a transducer that is adjacent to a rotatable disk in a disk drive. The transducer is moved in a seek operation from an initial track to a target track on the disk based on a current command. At least one transducer state relative to the disk is determined while seeking. At least one transducer state relative to the disk is measured while seeking. An acceleration-phase state error is determined that is indicative of an error between the estimated at least one transducer state and the measured at least one transducer state as the transducer is accelerated toward the target track during the seeking. The current command is generated based on the acceleration-phase state error.

In some further embodiments of the present invention, the estimated transducer state may be a velocity and/or location of the transducer relative to the disk. The acceleration-phase state error may be substantially determined while the transducer is accelerating at least a threshold amount toward the target track during the seeking, or only while the transducer is accelerating at least a threshold amount toward the target track during the seeking.

In some further embodiments of the present invention, the current command may be constraining based on the acceleration-phase state error. A seek-phase state error may be determined that is indicative of an error between the estimated at least one transducer state and the measured at least one transducer state while the transducer is accelerating and decelerating toward the target track during the seeking. An input actuator current may be generated based on the current command and a gain value, and may be used to move the transducer during the seeking. The gain value may be adjusted based on the seek-phase state error.

Accordingly, seeking of the transducer can be controlled based on a difference between the measured and estimated transducer states, and based on whether the transducer is being accelerated. When the state error occurs while the transducer is being accelerated, the state error is likely associated with a modeling error that can be associated with an acceleration phase, such as back emf or maximum current. Accordingly, the current command that is used to accelerate the transducer during a seek may be constrained based on the acceleration-phase state error. In contrast, when the state error occurs while the transducer is not being accelerated, the state error is likely associated with a modeling error that can be associated with a non-acceleration phase, such as a gain value or bias. Accordingly, the gain value may be adjusted based on the seek-phase state error. In this manner, control of a transducer during seeking may be dynamically adjusted to compensate for variations over time of the physical and/or electrical operational parameters of a disk drive.

Some other embodiments of the present invention provide an apparatus that controls the seeking of a transducer. The apparatus includes a servo controller that is configured to seek the transducer from an initial track to a target track on a disk based on a current command, configured to estimate at least one transducer state relative to the disk while seeking, configured to measure at least one transducer state relative to the disk while seeking, configured to determine an acceleration-phase state error that is indicative of an error between the estimated at least one transducer state and the measured at least one transducer state as the transducer is accelerated toward the target track during the seeking, and configured to generate the current command based on the acceleration-phase state error. The servo controller may include a HDA model that is configured to generate the estimate of the at least one transducer state relative to the disk while seeking. The HDA model may estimate velocity and/or location of the transducer relative to the disk.

In some further embodiments of the present invention, the servo controller may be configured to constrain the current command based on the acceleration-phase state error. The servo controller may be configured to determine a seek-phase state error that is indicative of an error between the estimated at least one transducer state and the measured at least one transducer state while the transducer is accelerating and decelerating toward the target track during the seeking, and is configured to control the seeking of the transducer based on the seek-phase state error. The apparatus may include a driver that is configured to generate an input actuator current based on the current command and a gain value, and a motor that is configured to move the actuator based on the input actuator current. The servo controller may be configured to adjust the gain value based on the seek-phase state error.

Some other embodiments of the present invention provide a computer program product for controlling seeking of a transducer that is adjacent to a rotatable disk in a disk drive. The computer program product includes computer program code that is configured to seek the transducer from an initial track to a target track on the disk based on a current command, to estimate at least one transducer state relative to the disk while seeking, to measure at least one transducer state relative to the disk while seeking, to determine an acceleration-phase state error that is indicative of an error between the estimated at least one transducer state and the measured at least one transducer state as the transducer is accelerated toward the target track during the seeking, and to generate the current command based on the acceleration-phase state error.

DETAILED DESCRIPTION OF THE INVENTION

Figure 1:
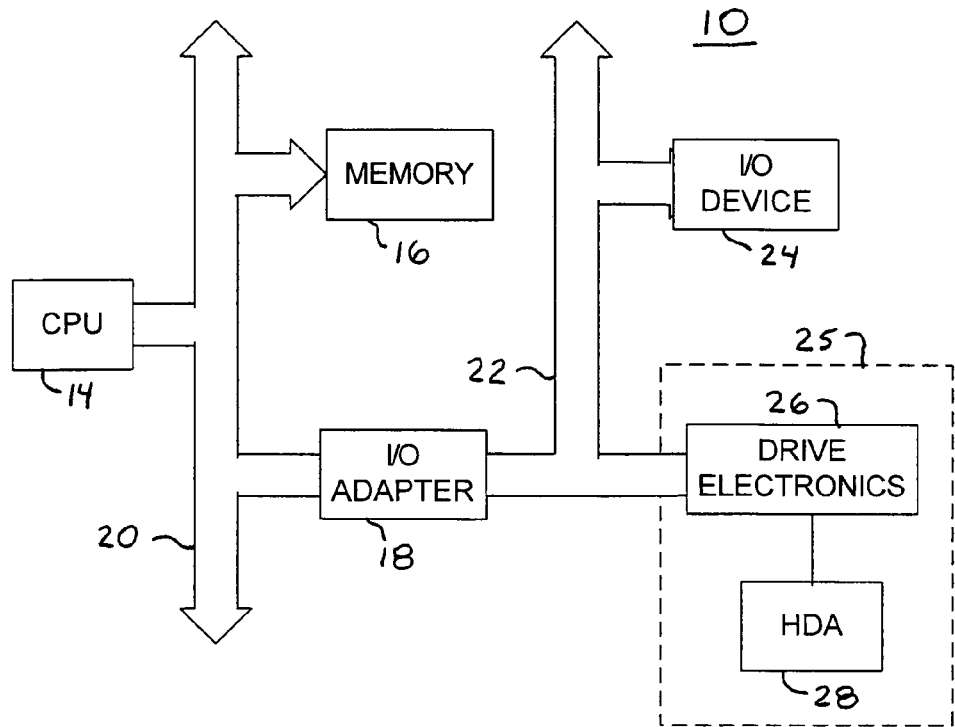
FIG. 1 is a block diagram of an exemplary computer system that includes a disk drive.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions. As used herein the term "and/or" includes any and all combinations of one or more of the associated listed items.

The present invention may be embodied as apparatus, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disk read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described below with reference to block diagrams and/or operational illustrations of apparatus, methods, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Referring to FIG. 1, an exemplary computer system 10 is shown that includes a central processing unit ("CPU") 14, a main memory 16, and I/O bus adapter 18, all interconnected by a system bus 20. Coupled to the I/O bus adapter 18 is I/O bus 22, that may be, for example, a small computer system interconnect (SCSI) bus, firewire bus, and/or a universal serial bus. The I/O bus 22 supports various peripheral devices 24 and a data storage unit such as a disk drive 25. The disk drive 25 includes drive electronics 26 and a head disk assembly 28 ("HDA").

Figure 2:
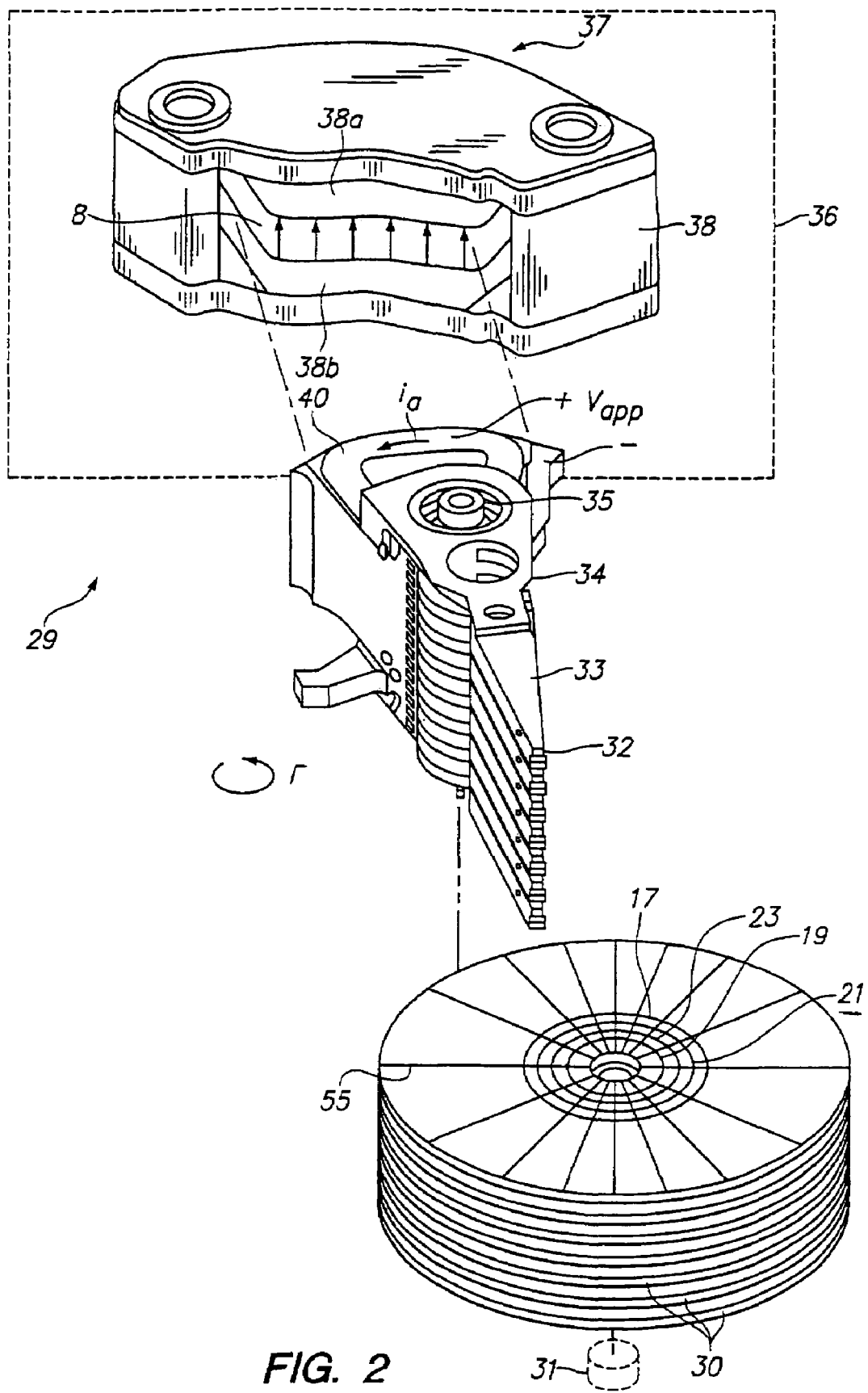
FIG. 2 is a diagram of an exemplary head disk assembly of the disk drive.

Referring to FIG. 2, an exemplary embodiment of the HDA 28 of FIG. 1 is shown that includes an actuator 29 and disks 30 that can be rotated by a spindle motor 31. Data can be stored on the disks 30 in concentric circular data tracks 17. The data can be written and read from the disks 30 via magnetic transducers 32 which are attached to flexible load beams 33 extending from actuator arms 34. The actuator arms 34 pivot about point 35 to move the load beams 33 in a radial direction over the storage surfaces of the disks 30 from an initial track 19 towards a target track 21 shown in FIG. 2 by example. At the target track 21, the magnetic transducers 32 can read from and/or write data on the disks 30. A motor 36 controls the radial movement of the actuator arms 34 in proportion to an input actuator current $i_a$. Although the disks 30 are described as magnetic disks for purposes of illustration, the disks 30 may alternatively be optical disks or any other type of storage disk which can have data storage tracks defined on one or both of its storage surfaces.

The exemplary motor 36 can include a magnet 37 containing two plates 38a, 38b coupled together via a pair of sidewalls to form a flat toroidal shaped member 38. A wire coil 40 is disposed between the two plates 38a and 38b. The magnet 37 may generate a constant magnetic field B between the plates 38a and 38b. When the input actuator current $i_a$ is induced in the coil 40 disposed in the magnetic field B, a torque is produced on the actuator arms 34 resulting in radial motion of the arms 34 about pivot point 35. The polarity of the input actuator current $i_a$ determines the direction of radial motion of the actuator arms 34.

Figure 3:
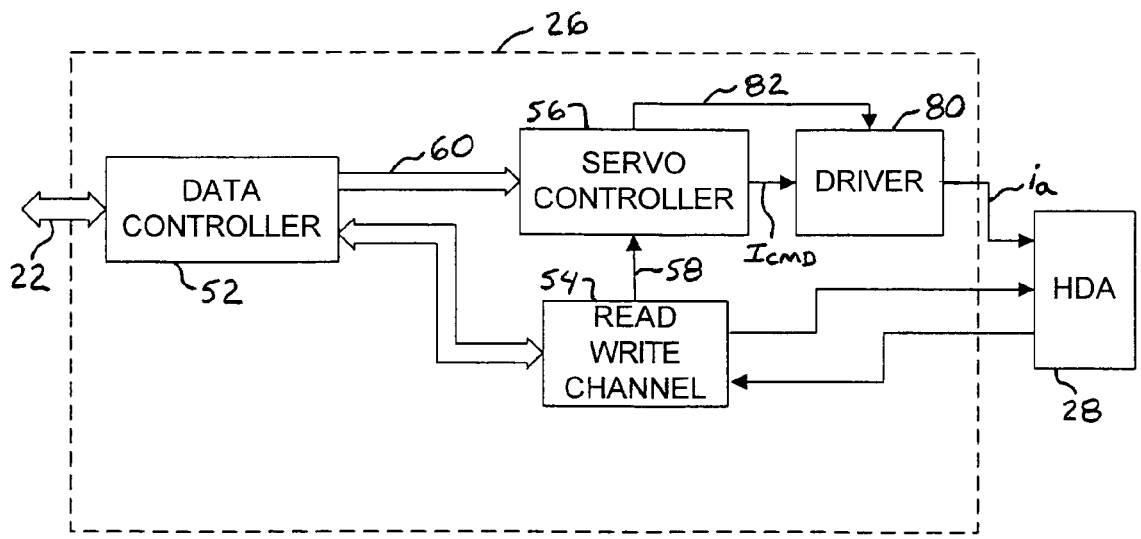
FIG. 3 is a block diagram of the drive electronics of the disk drive according to some embodiments of the present invention.

Referring to FIG. 3, the drive electronics 26 (FIG. 1) includes a data controller 52, a read/write channel 54, a servo controller 56, and a driver 80 according to some embodiments of the present invention. A data transfer initiated by the CPU 14 to the disk drive 25 may involve for example a DMA transfer of data from the memory 16 onto the system bus 20 (FIG. 1). Data from the system bus 20 are transferred by the I/O adapter 18 onto the I/O bus 22. The data are read from the I/O bus 22 by the data controller 52, which formats the data into blocks with the appropriate header information and transfers the digital data to the read/write channel 54.

The read/write channel 54 can operate in a conventional manner to convert data between the digital form used by the data controller 52 and the analog form used by the transducers 32. For the transfer from the CPU 14 to the HDA 28, the read/write channel 54 converts the data to an analog form suitable for writing by a transducer 32 to the HDA 28. The read/write channel 54 also provides servo positional information read from the HDA 28 to the servo controller 56 on lines 58. Specifically, the concentric data tracks 17 on the storage surface of a data disk 30 can be broken up and divided into segments by a multiplicity of regularly spaced apart embedded servo sectors 55 (FIG. 2). Each servo sector 55 can include transducer location information such as a track identification field for identifying the track address that includes the servo sector 55, and burst fields to provide servo fine location information, and which can be used to detect the location of the transducer 32 in relation to that track. The transducer location information is induced into the transducer 32, converted from analog signals to digital data in the read/write channel 54, and transferred to the servo controller 56. The servo controller 56 can use the transducer location information for performing seek and tracking operations of the transducer 32 over the disk tracks 17.

The data controller 52 also provides target track location data on lines 60 to the servo controller 56. The target track location data on lines 60 provides course positioning information to the servo controller 56 for specifying a seek length, wherein the seek length is the radial distance that the actuator arm 34 must move the transducer 32 from, for example, the initial track 19 to reach the target track 21 to which the CPU 14 has requested access. The seek time is the time period for the transducer 32 to cross over the tracks by accelerating and subsequently decelerating between the initial track 19 and the target track 21. As used herein, a "seek-phase" refers to an operational phase when the transducer 32 is being moved during a seek, an "acceleration-phase" refers to when the transducer 32 is being accelerated during a seek, and a "deceleration-phase" refers to when the transducer 32 is being decelerated during a seek. The servo controller 56 uses the seek length data on lines 60 and the servo transducer location information on lines 58 to generate, based thereon, a current command $I_{CMD}$ that adjusts the supply of the input actuator current $i_a$ to the motor 36, resulting in controlled movement of the actuator arm 34 and transducer 32 as described below. The current command $I_{CMD}$ may be selected from among a table of a plurality of current command levels and corresponding seek times.

Figure 4:
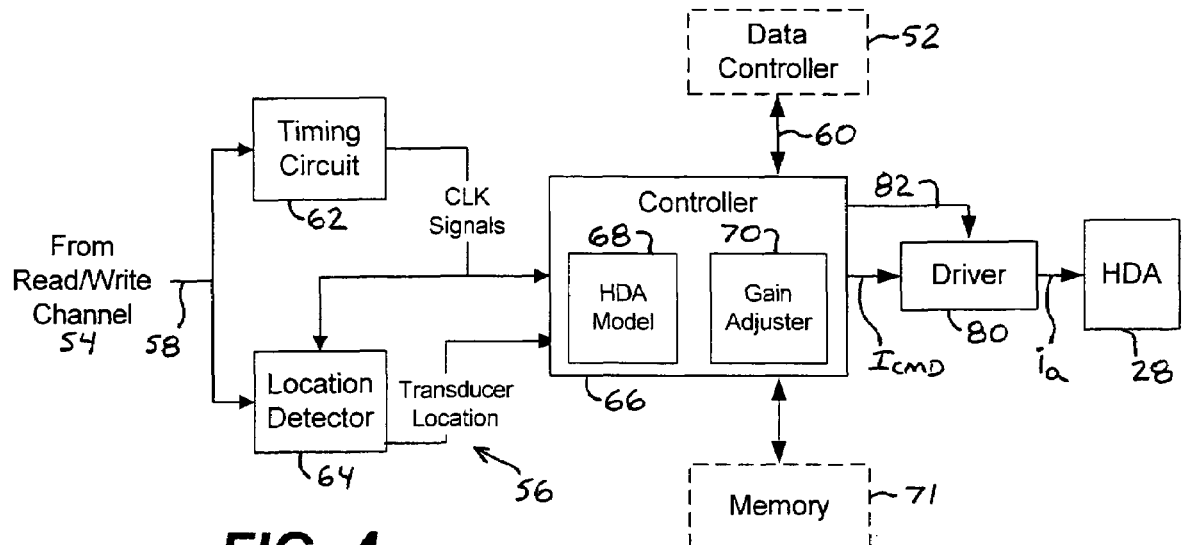
FIG. 4 is a block diagram of the servo controller according to some embodiments of the present invention.

Referring to FIG. 4, the servo controller 56 can include a timing circuit 62, a location detector 64, and a controller 66. The timing circuit 62 can generate clock signals synchronized with the passage of servo sectors 55 on tracks under the transducer 32. The timing circuit 62 can include a counter and a phase locked loop for generating the clock signals. In response to the clock signals from the timing circuit 62, the location detector 64 detects transducer radial location from transducer location data provided by the read/write channel 54, as the transducer location information in each servo sector 55 of the rotating disk 30 pass under the moving transducer 32. The detected transducer location information in each servo sector 55 provides the address of the track which contains the servo sector 55, and therefore, the location of the transducer 32 relative to that track. The timing circuit 56 is synchronized with the read/write channel 54, and the location detector 64 receives the transducer location data from the read/write channel 54.

The controller 66 can control movement and positioning of the transducer 32 during seek operations. In response to clock signals from the timing circuit 62, where each clock signal indicates passage of a servo sector 55 under the transducer 32. The controller 66 obtains the transducer location information from the location detector 64. The controller 66 can thereby measure one or more states of the transducer 32, such as location and velocity, relative to the disks 30 while seeking.

The controller 66 can include a HDA model 68 and a gain adjuster 70. The HDA model 68 is configured to have about the same input/output response characteristics as the HDA 28 (e.g., model the HDA 28 as a third order system). The HDA model 68 may include a saturation model and a linear model of the HDA 28. The saturation model may be used to determine, for example, back emf and/or maximum current. The linear model may be used to determine, for example, gain or bias errors, as will be discussed below. The HDA model 68 estimates at least one transducer state that is associated with the transducer 32. In some embodiments of the present invention, the HDA model 68 generates a location estimate (location state) and a velocity estimate (velocity state) for the transducer 32, based on, for example, transducer location information from the location detector 64. These state estimates can take into account estimated spring forces exerted upon the actuator 29 as a result of, for example, inertial and wind based forces on the actuator arms 34, load beams 33 and transducer 32.

During a seek operation, the controller 66 generates a current command $I_{CMD}$ for moving the transducer 32 based on the at least one estimated transducer state, the transducer location information and the destination track data from the data controller 52. For example, the controller 66 may select a current command profile from among a plurality of current command profiles, and may generate the current command $I_{CMD}$ based on the selected current command profile. The current command $I_{CMD}$ from the controller 66 is provided to the driver 80, which supplies the input actuator current $i_a$ to the HDA 28 (i.e., actuator 29) based on the current command $I_{CMD}$ and based on a gain adjust signal 82. For example, the driver 80 may apply a variable gain value to the current command $I_{CMD}$ based on the gain adjust signal 82 to generate the input actuator current $i_a$. When the input actuator current $i_a$ is applied to the motor 36 (FIG. 2), the transducer 32 can move radially inward or radially outward in a seek operation.

According to some embodiments of the present invention, the controller 66 controls the seeking of the transducer 32 based on a difference between the measured and estimated transducer states (i.e., state error(s)), and based on whether the transducer 32 is being accelerated (i.e., an accelerated-state) or is otherwise in a seek operation but not accelerating. When the state error occurs while the transducer 32 is being accelerated, the state error is likely associated with a modeling error (e.g., saturation model) of the back emf or maximum current. Accordingly, as will be discussed below, the controller 66 determines a maximum current command and can constrain the current command $I_{CMD}$ that it generates to accelerate the transducer 32 based thereon. In contrast, when the state error occurs while the transducer 32 is not being accelerated, the state error is likely associated with a modeling error (e.g., linear model) of the gain value of the driver 80 or bias. Accordingly, as will be also discussed below, the controller 66 determines a seek-phase state error and controls the gain value of the driver 80 based thereon.

In some embodiments of the present invention, the controller 66 determines an acceleration-phase state error that is indicative of an error between one or more of the measured state(s) of the transducer 32 and the estimated transducer state(s) while the transducer is being accelerated toward the target track 21 during a seek operation. In one embodiment, the controller 66 may substantially determine the acceleration-phase state error while the transducer is accelerating at least a threshold amount toward the target track 21 while seeking. In another embodiment, the controller 66 only determines the acceleration-phase state error while the transducer is accelerating at least a threshold amount toward the target track 21. In yet another embodiment, the controller 66 only determines the acceleration-phase state error while the current command $I_{CMD}$ exceeds a threshold value. The controller 66 then generates the current command $I_{CMD}$ based on the determined acceleration-phase state error.

In some embodiments of the present invention, the controller 66 constrains the current command $I_{CMD}$ based on the acceleration-phase state error. For example, as will be discussed further below, the controller 66 may determine a maximum current command based on the acceleration-phase state error, and may constrain the current command $I_{CMD}$ to be no larger than the determined maximum current command. Accordingly, when a state error is identified while the transducer 32 is accelerating during a seek operation, the state error may be attributed to an error in the saturation model of the HDA model 68. The maximum allowable current command $I_{CMD}$ that is used to accelerate the transducer 32 can then be dynamically adjusted based thereon to compensate for variations over time of the physical and/or electrical operational parameters of the disk drive.

Figure 5:
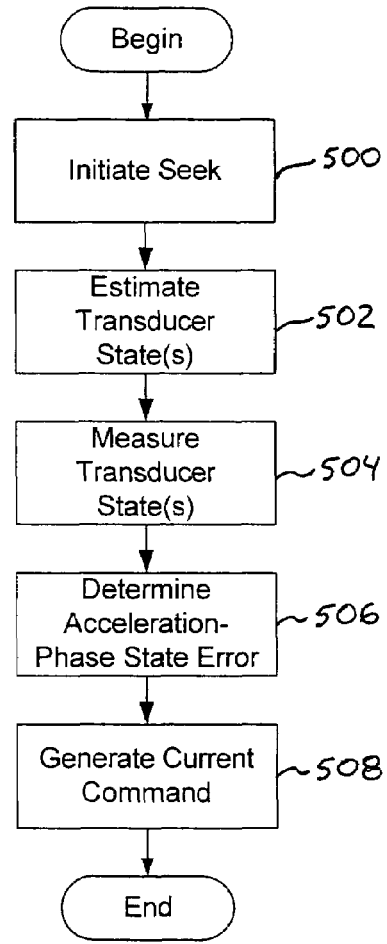
FIG. 5 is a flowchart showing a process for controlling seeking of a transducer based on an acceleration-phase state error according to some embodiments of the present invention.

Referring now to FIG. 5, a flow chart is shown that illustrates operations for controlling seeking of the transducer 32 in accordance with various embodiments of the present invention. At least some of the operations shown in FIG. 5 may be carried out by the servo controller 56 shown in FIG. 3. At Block 500, a seeking operation is initiated in which the transducer 32 seeks from, for example, the initial track 19 to the target track 21 on the disks 30 based on a current command. At Block 502, at least one transducer state is estimated, such as by the HDA model 68 of FIG. 4. At Block 504, at least one transducer state is measured relative to the disks 30 while seeking. At Block 506, an acceleration-phase state error is determined that is indicative of an error between the estimated transducer state(s) and the measured transducer state(s) as the transducer is accelerated toward the target track 21 during the seeking. At Block 508, the current command is generated based on the determined acceleration-phase state error.

With reference again to FIG. 3, the controller 66 can also determine a seek-phase state error that is indicative of an error between one or more of the measured state(s) of the transducer 32 and the estimated transducer state(s) while the transducer is accelerating and decelerating toward the target track 21 during a seek operation. The controller 66, via the gain adjuster 70 may generate the gain adjust signal 82 based on the determined seek-phase state error to vary the gain value that is applied to the current command $I_{CMD}$ by the driver 80 to generate the input actuator current $i_a$.

By constraining the current command $I_{CMD}$ based on the acceleration-phase state error and adjusting the gain value of the driver 80 and, thereby, the input actuator current $i_a$, based on the seek-phase state error, the servo controller 56 may compensate for variations in the operation of the HDA 28 that may occur over time, such as due to temperature variations. Such adaptive compensation may improve the seek performance of the servo controller 56.

Figure 6:
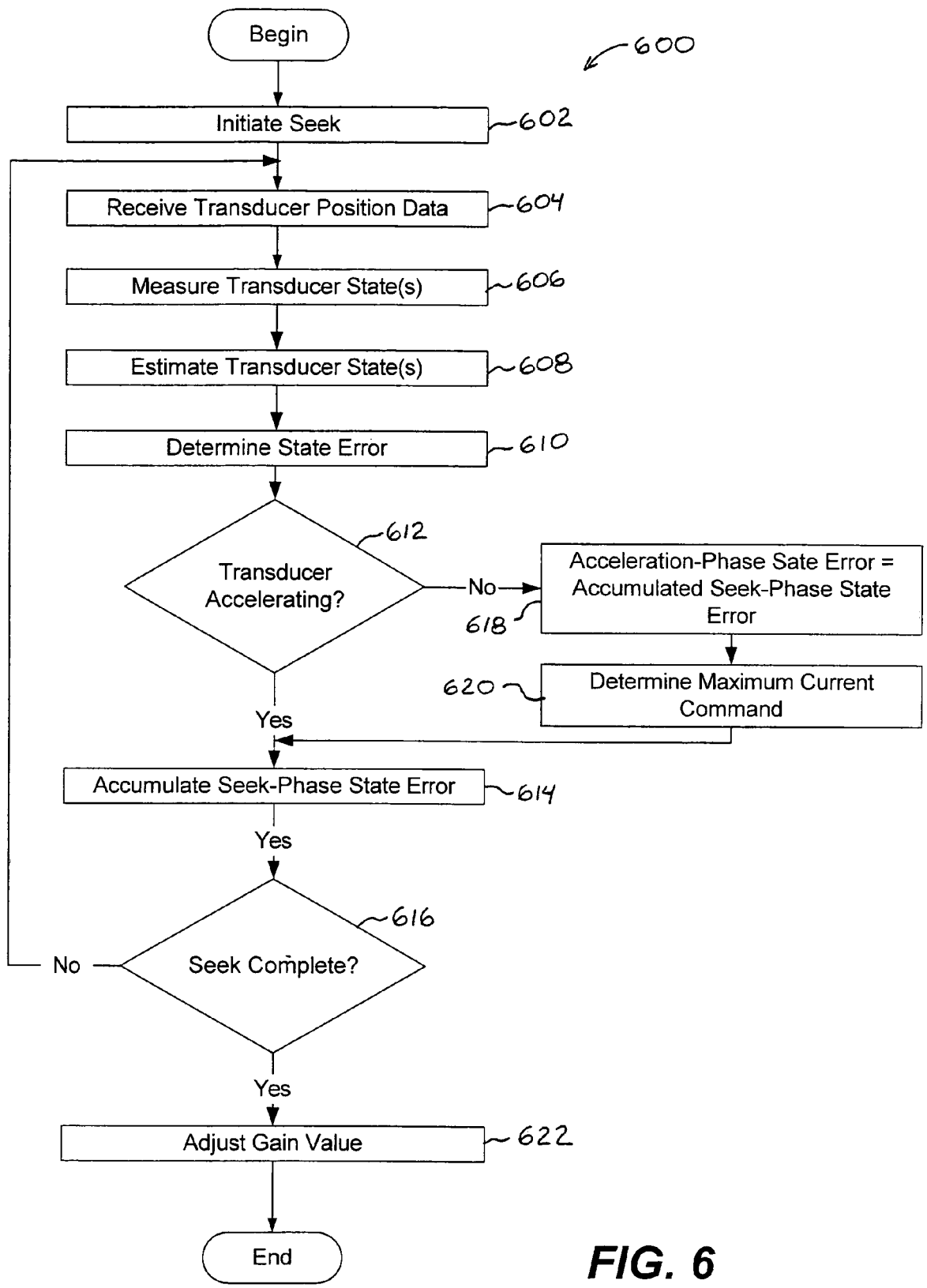
FIG. 6 is a flowchart showing a process for controlling seeking of a transducer based on an acceleration-phase state error and based on a seek-phase state error according to some embodiments of the present invention.

A manner in which the acceleration-phase state error and seek-phase state error can be determined and used to control seeking of the transducer 32 will now be discussed with reference to the process 600 illustrated in FIG. 6, in accordance with various embodiments of the present invention. The process 600 may be performed during each seek operation to determine the acceleration-phase state error and seek-phase state error. Based on these state errors, the maximum current command value from the controller 66 and the gain value of the driver 80 may be adaptively adjusted. At Block 602, a seek operation is initiated in which the transducer 32 (FIG. 2) is accelerated and subsequently decelerated between the initial track 19 and the target track 21. At Block 604, transducer location data is received from the location detector 64. At Block 606, one or more states of the transducer are measured based on the transducer location data. At Block 608, one or more transducer states are estimated, such as via the HDA model 68 of FIG. 4. At Block 610, the seek-phase state error is determined based on the measured and estimated transducer state(s).

At Block 612, a decision is made as to whether the transducer 32 is accelerating, and, if it is accelerating, then the seek-phase state error is summed-up at Block 614 to generate an accumulated seek-phase state error. The accumulated seek-phase state error may be determined based on the following equation:

$$B(K) = B(K-1) + EstErr(K) * I(K), \quad (1)$$

where K is based on successive transducer location data samples, EstErr(K) is the state estimate error for the present sample K, I(K) is a current command for the present servo sector (e.g., servo sector 55 of FIG. 2), B(K-1) is the accumulated seek-phase state error for the previous sample K-1, and B(K) is the accumulated seek-phase state error for the present sample K.

At Block 616, a decision is made as to whether the seek is complete, and, if it is not complete, then the process 600 loops back to continue again from Block 604. The operations repeat in this manner until the transducer 32 is determined at Block 612 to not be accelerating, at which time the operations in Blocks 618 and 620 are carried out. The decision at Block 612 may be based on whether the transducer 32 is accelerating at least a threshold amount toward the target track 21, based on a polarity of the current command, and/or based on whether the current command exceeds a threshold value.

At Block 618, the acceleration-phase state error is determined based on (e.g., set equal to) the accumulated seek-phase state error. At Block 620 the maximum current command is determined based on the acceleration-phase state error. The maximum current command may be determined based on the following equation:

$$MaxUEst(seek) = MaxUEst(seek-1) + b * B_{ACCEL\_PHASE}, \quad (2)$$

where $B_{ACCEL\_PHASE}$ is the acceleration-phase state error (e.g., value of seek-phase state error after the transducer stops accelerating), b is a convergence value, MaxUEst (seek-1) is the accumulated maximum current command generated from a previous seek operation, and MaxUEst(seek) is the accumulated maximum current command for the present seek operation. The current command $I_{CMD}$ that is generated by the controller 66 may then be constrained based on (e.g., limited to no more than) the accumulated maximum current command for the present seek operation, MaxUEst(seek). The maximum current command may thereby be adaptively updated for each seek operation, or selectively for seeks that satisfy certain conditions, such as seeks where the motor 36 will operate in a saturated mode for the current command $I_{CMD}$.

When the seek is determined at Block 616 to be complete, then at Block 622 the gain value of the driver 80 is adjusted via, for example, the gain adjuster 70 and the gain adjust signal 82 of FIGS. 3–4. The gain value may be determined based on the following equation:

$$GainEst(seek) = GainEst(seek-1) + a * B(final), \quad (3)$$

where B(final) is the final value of B after the seek is complete, "a" is a convergence value, GainEst(seek-1) is the accumulated gain value generated from a previous seek operation, and GainEst(seek) is the accumulated gain value for the present seek operation.

The process 600 may then be repeated during subsequent seek operations to adaptively adjust the maximum current command that may be used to constrain the current command $I_{CMD}$ and/or to adjust the gain value of the driver 80 based on variations in the operation of the HDA 28 that may occur over time.

Accordingly, the seek-phase state error may be determined based on the following equation:

$$B_{SUM} = \sum_{K=X1}^{X2} (B(K) + EstErr(K) * I(K)) \quad (4)$$

where $B_{SUM}$ is the accumulated seek-phase state error, X1 is a first location on the disk, X2 is a second location on the disk, K is a plurality of sample locations on the disk between X1 and X2, B(K) is an intermediate value of the seek-phase state error at the sample location K, EstErr(K) is an intermediate value of the seek-phase state error at the sample location K, and I(K) is the current command at the sample location K.

The input actuator current $i_a$ may then be generated via the driver 80 based on a current command and a gain value. The gain value may be determined following each of N seek operations based on the following equation:

$$GainEst = \sum_{K_S=1}^{N} (GainEst(Ks) + a * B_{SEEK}) \quad (5)$$

where GainEst is the accumulated gain value, $K_S$ is one the N seeks, $GainEst(K_S)$ is an intermediate value of the gain value for the $K_S$ seek, a is a convergence value, and $B_{SEEK}$ is $B_{SUM}$ where X1 is based on the initial track location on the disk and X2 is based on the target track location on the disk.

The current command may be constrained to no more than a maximum current command that can be determined based the following equation:

$$MaxUEst = \sum_{K_A=A1}^{A2} (MaxUEst(K_A) + b * B_{ACCEL\_PHASE}) \quad (6)$$

where MaxUEst is an accumulated maximum current command, A1 is a location associated with where the transducer begins accelerating toward the target track, A2 is a location associated with where the transducer stops accelerating toward the target track, $K_A$ is a plurality of sample locations on the disk between A1 and A2, $MaxUEst(K_A)$ is an intermediate value of the maximum current command at the sample location $K_A$, b is a convergence value, and $B_{ACCEL\_PHASE}$ is $B_{SUM}$ with X1 based on the location of A1 and X2 based on the location of A2.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of controlling seeking of a transducer that is adjacent to a rotatable disk in a disk drive, the method comprising:
   seeking the transducer from an initial track to a target track on the disk based on a current command;
   estimating at least one transducer state relative to the disk while seeking;

measuring at least one transducer state relative to the disk while seeking;

determining an acceleration-phase state error that is indicative of an error between the estimated at least one transducer state and the measured at least one transducer state as the transducer is accelerated toward the target track during the seeking; and generating the current command based on the acceleration-phase state error, wherein determining an acceleration-phase state error comprises substantially determining the acceleration-phase state error while the transducer is accelerating at least a threshold amount toward the target track during the seeking.

2. The method of claim 1, wherein:

estimating at least one transducer state comprises estimating velocity of the transducer relative to the disk; and measuring at least one transducer state comprises measuring velocity of the transducer relative to the disk.

3. The method of claim 1, wherein:

estimating at least one transducer state comprises estimating location of the transducer relative to the disk; and measuring at least one transducer state comprises measuring location of the transducer relative to the disk.

4. The method of claim 1, wherein determining an acceleration-phase state error comprises only determining the acceleration-phase state error while the transducer is accelerating at least a threshold amount toward the target track during the seeking.

5. The method of claim 1, wherein determining an acceleration-phase state error comprises determining the acceleration-phase state error only while the current command exceeds a threshold value.

6. The method of claim 1, wherein generating the current command comprises constraining the current command based on the acceleration-phase state error.

7. The method of claim 6, wherein constraining the current command comprises constraining the current command based the following equation:

$$MaxUEst = \sum_{K_A=A1}^{A2} (MaxUEst(K_A) + b * B_{ACCEL\_PHASE})$$

wherein MaxUEst is a maximum current command, A1 is a location associated with where the transducer begins accelerating toward the target track, A2 is a location associated with where the transducer stops accelerating toward the target track, $K_A$ is a plurality of sample locations on the disk from A1 to A2, MaxUEst($K_A$) is an intermediate value of the maximum current command at the sample location $K_A$, b is a convergence value, and $B_{ACCEL\_PHASE}$ is the accumulated acceleration-phase state error from A1 to A2.

8. The method of claim 1, further comprising determining a seek-phase state error that is indicative of an error between the estimated at least one transducer state and the measured at least one transducer state while the transducer is accelerating and decelerating toward the target track during the seeking.

9. The method of claim 8, further comprising:

generating an input actuator current based on the current command and a gain value, and wherein seeking the transducer comprises moving the transducer based on the input actuator current.

10. The method of claim 8, wherein the seek-phase state error is determined based on the following equation:

$$B_{SUM} = \sum_{K=X1}^{X2} (B(K) + EstErr(K) * I(K))$$

wherein $B_{SUM}$ is the accumulated seek-phase state error, X1 is a first location on the disk, X2 is a second location on the disk, K is a plurality of sample locations on the disk between X1 and X2, B(K) is an intermediate value of the seek-phase state error at the sample location K, EstErr(K) is an intermediate value of the seek-phase state error at the sample location K, and I(K) is the current command at the sample location K.

11. The method of claim 9, further comprising adjusting the gain value based on the seek-phase state error.

12. The method of claim 10, further comprising seeking the transducer a plurality of times (N), and wherein generating the current command is based on a gain value that is determined based on the following equation:

$$GainEst = \sum_{K_S=1}^{N} (GainEst(Ks) + a * B_{SEEK})$$

wherein GainEst is the accumulated gain value, $K_S$ is one of the N seeks, GainEst($K_S$) is an intermediate value of the gain value for the $K_S$ seek, "a" is a convergence value, and $B_{SEEK}$ is $B_{SUM}$ where X1 is based on the initial track location on the disk and X2 is based on the target track location on the disk.

13. The method of claim 12, wherein generating the current command comprises constraining the current command based the following equation:

$$MaxUEst = \sum_{K_A=A1}^{A2} (MaxUEst(K_A) + b * B_{ACCEL\_PHASE})$$

wherein MaxUEst is an accumulated maximum current command, A1 is a location associated with where the transducer begins accelerating toward the target track, A2 is a location associated with where the transducer stops accelerating toward the target track, $K_A$ is a plurality of sample locations on the disk between A1 and A2, MaxUEst($K_A$) is an intermediate value of the maximum current command at the sample location $K_A$, b is a convergence value, and $B_{ACCEL\_PHASE}$ is $B_{sum}$ with X1 based on the location of A1 and X2 based on the location of A2.

14. An apparatus for controlling the seeking of a transducer, the apparatus comprising:

a servo controller that is configured to seek the transducer from an initial track to a target track on a disk based on a current command, configured to estimate at least one transducer state relative to the disk while seeking, configured to measure at least one transducer state relative to the disk while seeking configured to determine an acceleration-phase state error that is indicative of an error between the estimated at least one transducer state and the measured at least one transducer state as the transducer is accelerated toward the target track during the seeking, and configured to generate the current command based on the acceleration-phase state error, wherein the servo controller is configured to substantially determine the acceleration-phase state error while the transducer is accelerating at least a threshold amount toward the target track during the seeking.

15. The apparatus of claim 14, wherein the servo controller comprises a HDA model that is configured to generate the estimate of the at least one transducer state relative to the disk while seeking.

16. The apparatus of claim 15, wherein the HDA model is configured to estimate velocity of the transducer relative to the disk.

17. The apparatus of claim 15, wherein the HDA model is configured to estimate location of the transducer relative to the disk.

18. The apparatus of claim 14, wherein the servo controller is configured to only determine the acceleration-phase state error while the transducer is accelerating at least a threshold amount toward the target track during the seeking.

19. The apparatus of claim 14, wherein the servo controller is configured to determine the acceleration-phase state error only while the current command exceeds a threshold value.

20. The apparatus of claim 14, wherein the servo controller is configured to constrain the current command based on the acceleration-phase state error.

21. The apparatus of claim 20, wherein the servo controller is configured to constrain the current command based on the following equation:

$$MaxUEst = \sum_{K_A=A1}^{A2} (MaxUEst(K_A) + b * B_{ACCEL\_PHASE})$$

wherein MaxUEst is a maximum current command, A1 is a location associated with where the transducer begins accelerating toward the target track, A2 is a location associated with where the transducer stops accelerating toward the target track, $K_A$ is a plurality of sample locations on the disk from A1 to A2, MaxUEst($K_A$) is an intermediate value of the maximum current command at the sample location $K_A$, b is a convergence value, and $B_{ACCEL\_PHASE}$ is the accumulated acceleration-phase state error from A1 to A2.

22. The apparatus of claim 14, wherein the servo controller is configured to determine a seek-phase state error that is indicative of an error between the estimated at least one transducer state and the measured at least one transducer state while the transducer is accelerating and decelerating toward the target track during the seeking, and is configured to control the seeking of the transducer based on the seek-phase state error.

23. The apparatus of claim 22, further comprising:
a driver that is configured to generate an input actuator current based on the current command and a gain value, wherein the servo controller is configured to adjust the gain value based on the seek-phase state error; and a motor that is configured to move the actuator based on the input actuator current.

24. The apparatus of claim 23, wherein the servo controller is configured to determine the seek-phase state error based on the following equation:

$$B_{SUM} = \sum_{K=X1}^{X2} (B(K) + EstErr(K) * I(K))$$

wherein $B_{SUM}$ is the accumulated seek-phase state error, X1 is a first location on the disk, X2 is a second location on the disk, K is a plurality of sample locations on the disk between X1 and X2, B(K) is an intermediate value of the seek-phase state error at the sample location K, EstErr(K) is an intermediate value of the seek-phase state error at the sample location K, and I(K) is the current command at the sample location K.

25. The apparatus of claim 24, wherein the servo controller is configured to adjust the gain value based on the following equation:

$$GainEst = \sum_{K_S=1}^{N} (GainEst(Ks) + a * B_{SEEK})$$

wherein GainEst is the accumulated gain value, $K_S$ is one of the N seeks, GainEst($K_S$) is an intermediate value of the gain value for the $K_S$ seek, "a" is a convergence value, and BSEEK is BSUM where X1 is based on the initial track location on the disk and X2 is based on the target track location on the disk.

26. The apparatus of claim 25, wherein the servo controller is configured to constrain the current command based on the following equation:

$$MaxUEst = \sum_{K_A=A1}^{A2} (MaxUEst(K_A) + b * B_{ACCEL\_PHASE})$$

wherein MaxUEst is an accumulated maximum current command, A1 is a location associated with where the transducer begins accelerating toward the target track, A2 is a location associated with where the transducer stops accelerating toward the target track, $K_A$ is a plurality of sample locations on the disk between A1 and A2, MaxUEst($K_A$) is an intermediate value of the maximum current command at the sample location $K_A$, b is a convergence value, and $B_{ACCEL\_PHASE}$ is $B_{SUM}$ with X1 based on the location of A1 and X2 based on the location of A2.

27. A computer program product for controlling seeking of a transducer that is adjacent to a rotatable disk in a disk drive, the computer program product comprising computer program code embodied in a computer-readable storage medium, the computer program code comprising:

computer program code that is configured to seek the transducer from an initial track to a target track on the disk based on a current command;

computer program code that is configured to estimate at least one transducer state relative to the disk while seeking;

computer program code that is configured to measure at least one transducer state relative to the disk while seeking;

computer program code that is configured to determine an acceleration-phase state error that is indicative of an error between the estimated at least one transducer state and the measured at least one transducer state as the transducer is accelerated toward the target track during the seeking, and is further configured to substantially determine the acceleration-phase state error while the transducer is accelerating at least a threshold amount toward the target track during the seeking; and computer program code that is configured to generate the current command based on the acceleration-phase state error.

* * * * *